United States Patent [19]

Oehr et al.

[11] Patent Number: 5,645,805

[45] Date of Patent: Jul. 8, 1997

[54] REDUCTION OF ACID RAIN AND OZONE DEPLETION PRECURSORS

[75] Inventors: Klaus Heinrich Oehr, Surrey, Canada; Girard A. Simons, Lynnfield, Mass.; Jiahua Zhou, Vancouver, Canada

[73] Assignee: Dynamotive Corporation, Vancouver, Canada

[21] Appl. No.: 491,751

[22] Filed: Jun. 19, 1995

Related U.S. Application Data

[63] Continuation-in-part of Ser. No. 130,123, Sep. 30, 1993, Pat. No. 5,458,083.

[51] Int. Cl.⁶ .................. B01D 53/60; C01B 21/00; C10L 10/00
[52] U.S. Cl. .................. 423/239.1; 44/604; 252/192; 423/235; 423/243.08; 423/244.07; 431/3
[58] Field of Search ............... 252/192; 554/178; 44/604; 127/32; 530/500, 226; 423/239.1, 242.3, 242.4, 242.5, 244.01, 244.05, 243.08, 244.07; 431/3

[56] References Cited

U.S. PATENT DOCUMENTS

| | | | |
|---|---|---|---|
| 1,538,269 | 5/1925 | Colas | 530/500 |
| 1,917,660 | 7/1933 | Martin et al. | 554/178 |
| 3,970,434 | 7/1976 | Gasior et al. | 44/604 |
| 4,259,085 | 3/1981 | Ban et al. | 44/604 X |
| 4,319,885 | 3/1982 | Brown | 44/604 |
| 4,505,776 | 3/1985 | Murray | 252/192 X |
| 4,615,871 | 10/1986 | Yoon | 423/243 |
| 4,728,393 | 3/1988 | Peel | 530/500 X |
| 4,786,485 | 11/1988 | Kirchgessner et al. | 252/192 X |
| 5,288,857 | 2/1994 | Aarsrud et al. | 530/500 |
| 5,458,803 | 10/1995 | Oehr | 252/192 |

OTHER PUBLICATIONS

Ye et al., *Coal Combustion Science and Technology of Industrial and Utility Application*, Hemisphere Publishing Corp., NY, (1988) pp. 565–572.

Levendis, Y.A., *J. Energy and Fuels* (1989) Chap. 9.

Elliott et al., *J. Energy and Fuels* (1991) 5:399–410.

Beckman et al., "Economic Assessment of a Wood Fast Pyrolysis Plant", AITBC Conference, Interlaken, Switzerland (1992).

Piskorz et al., "Liquid Products from the Fast Pyrolysis of Wood and Cellulose", Research in Thermal Biomass Conversion, Elsevier Science Publishers, NY (1988) pp. 557–571.

Ohtsuka et al., "Catalytic Gasification of Low–Rank Coals with Calcium Acetate", Elsevier Science Publishers, NY (1991) pp. 253–271.

Rodden, G., *Canadian Chemical News* (1993) 45(8):35–37.

Vogiatzis, et al., *Blackie Academic & Professional* (1994) 2:1095–1102.

*Primary Examiner*—Richard D. Lovering
*Attorney, Agent, or Firm*—Morrison & Foerster LLP

[57] ABSTRACT

A method of reducing acid emissions and ozone deletion precursors from a flue gas produced by the combustion of sulphur-or nitrogen-containing fuel or acid emissions and ozone deletion precursors from chemical plants. The method comprises introducing into a flue containing the gas, an additive derived from the chemical reaction of pyrolysis liquor with an alkaline earth metal compound in the presence of an oxidant. This reaction produces a hydrophobic/hydrophilic mixture containing a plurality of thermolabile alkaline earth metal compounds. These compounds are able to decompose at flue gas temperature to produce an alkaline compound able to react with sulphur dioxide and oxides of nitrogen to eliminate them from the gas.

11 Claims, No Drawings

REDUCTION OF ACID RAIN AND OZONE DEPLETION PRECURSORS

CROSS-REFERENCE TO RELATED APPLICATION

This application is a continuation-in-part of application Ser. No. 08/130,123 filed Sep. 30, 1993 issued as U.S. Pat. No. 5,458,083, the disclosure of which is incorporated herein by reference.

FIELD OF THE INVENTION

This invention relates to a method of reducing acid emissions and ozone depletion precursors from a flue gas.

DESCRIPTION OF THE PRIOR ART

Ozone depletion and acid rain are problems throughout the world. The deterioration of the ozone layer is creating an epidemic in skin cancer and acid rain affects the environment by reducing air quality, rendering lakes acid and killing vegetation, particularly trees. It has been the subject of international dispute. Canada and the United States have argued over the production of acid rain. Britain and Scandinavia are other antagonists.

In the main acid rain stems from sulphur dioxide produced in smoke stacks. The sulphur dioxide typically originates from the combustion of a sulphur containing fuel, for example coal. The sulphur dioxide is oxidized in the atmosphere to sulphur trioxide and the trioxide is dissolved to form sulphuric acid. The rain is thus made acid. The oxides of nitrogen are known to be precursors to acid rain and NO is a catalytic agent in the destruction of the ozone layer. $N_2O$ is both a greenhouse gas, 270 times more absorptive than carbon dioxide, and a precursor to NO formation in the ozone layer. It has been argued that $N_2O$ photo-dissociation in the ozone layer is a greater source of NO than is the direct flux of NO from the earth's surface. The emission of oxides of nitrogen in the United States and Canada is about one fifth sulphur dioxide emissions. But that still means that millions of tons of oxides of nitrogen are fed to the atmosphere each year. Although it is believed that the production of sulphur dioxide has stabilized, larger emissions of the oxides of nitrogen are anticipated because of the increased use of fossil fuels.

With the passage of the International Clean Air Act amendments, such as issued in the United States in 1990, the curbing of NOx and SOx emissions has become a priority. Planners for electrical utilities in particular are developing strategies for reducing emissions of sulphur dioxide and nitrogen oxides in the production of electrical and thermal power. The majority of fossil fuel used in power production contains sulphur and organically bound nitrogen which produces sulphur dioxide and oxides of nitrogen during combustion.

Gas desulphurization systems are known. The majority rely on simple basic compounds such as calcium carbonate, sodium carbonate and calcium hydroxide to react with the acidic sulphur containing species to produce non-volatile products such as calcium sulphite, calcium sulphate and sodium sulphate. Urea and ammonia have been used to react with oxides of nitrogen generated during fossil fuel combustion to produce non-toxic nitrogen gas but urea and ammonia are expensive.

Conventional alkaline adsorbents such as calcium carbonate and calcium hydroxide undergo thermal decomposition to calcium oxide at high temperature which reacts readily with the sulphur dioxide. However the adsorbents suffer from fouling problems. Calcium sulphite or calcium sulphate is formed at the surface of the calcium oxide and plugs the pores of the particles. This results in substantial amounts of unreacted, alkaline calcium oxide being produced during flue gas desulphurization. These alkaline solid wastes are toxic and undesirable. Successful attempts to solve this problem have relied on particle abrasion achieved in fluidized bed combustion of fossil fuels. For example in the combustion of coal, calcium sulphite/sulphate surfaces can be partially ruptured to expose fresh calcium oxide substrate, which can undergo further reaction with the sulphur species.

The prior art has also described the use of aqueous alkali metal acetates, for example aqueous calcium acetate, calcium magnesium acetate and barium acetate, to act as carbon combustion accelerators and calcium oxide precursors but cost effective calcium desulphurization and combustion accelerator agents have not yet been found. Production of nitrogen oxides during fossil fuel combustion increases with combustion temperature and residence time. Increasing the combustion rate or decreasing the combustion temperature of fossil fuels decreases nitrogen oxide emissions but the prior art has not revealed how this can be achieved.

U.S. Pat. No. 4,615,871 to Yoon describes the reduction of the content of flue gas derived from combustion of a sulphur containing fuel. An aqueous solution containing an alkaline earth metal formate or acetate is sprayed into the flue gas. This process requires the expensive production of pure solutions of calcium formate and calcium acetate. As the solutions are not contacted with the sulphur containing fuel they cannot enhance combustion rates to reduce nitrogen oxide emissions.

Techniques for the rapid pyrolysis of lignocellulosic—or starch—containing waste biomass to produce fuels with a high calorific value have been described. These fuels are acidic and corrosive to combustion equipment due to their high carboxylic acid content. The fuel value of such liquors is limited by this acidity.

U.S. Pat. No. 5,352,423 describes a method of removing pollutants from the exhaust of combustion systems containing substantial amounts of sulphur and nitrogen using calcium benzoate or calcium magnesium benzoate. Preferably the calcium benzoate is dry sprayed in the form of a fine powder or wet sprayed in an aqueous solution. This patent recommends the production of aromatic calcium salts such as calcium benzoate or calcium magnesium benzoate from coal using methods described in Volume 1 of "Chemistry of Coal Utilization". Pages 365 and 366 of this publication indicate that the yield of aromatic carboxylic acids (benzoic and isophthalic acids) derived from coal reached a maximum of 11.92 grams per 100 grams of dry ash-free coal using a two step pressurized, high temperature process. The oxidation required 1000 grams of coal in 2.5 litres of 2.5N sodium carbonate solution at 60 atmospheres pressure until 77.75% of the alkali carbonate had been converted to salts of organic acids. These acids represent "only a small fraction of the carbon in the coal" (page 366).

Lines 44 to 48 on page 5 of the above U.S. Pat. No. 5,352,423 indicate that the aromatic acids derived from coal can be converted to the desired salt by ion exchange of an aqueous solution by using a mix of acetic acid and calcite or dolomite stone pH=4. Addition of a base drives the reaction to completion. Alternatively commercially available calcium magnesium benzoate or other aromatic salts can be used (lines 28 to 30 on page 5).

The above U.S. patent specifies the use of aromatic salt.

U.S. Pat. No. 5,312,605 specifies the use of an acetate salt of a cation such as calcium magnesium acetate for simultaneous control of $SO_2$ and NOx pollutant emissions from a combustion system.

The prior art suffers from the following drawbacks:

1. Commercially available calcium salts of carboxylic acids are too expensive to be used in acid emission control. For instance benzoic acid, the potential commercial source of calcium benzoate, has a selling price of $0.6/lb (Chemical Marketing Reporter, Aug. 12, 1994) i.e. $1200 per ton.

2. Sources of aromatic calcium salts have been restricted to those salts which form hydrophilic solutions and are available from the oxidation of fossil fuels such as coal. It is clear that the intention of the prior art is to prepare highly water soluble calcium organic salts via ion exchange treatment (see U.S. Pat. No. 5,312,605).

3. The prior art has only demonstrated the use of single organic calcium salts which form hydrophilic solutions.

4. Suggested preparation techniques for production of aromatic carboxylic acids from coal or other fossil fuels require long reaction times, two stage reactions (i.e. 2 reactors) high pressures and high temperatures and ion exchange treatment. Yields of aromatic carboxylic acids are very low. Large volumes of non-recyclable aqueous wastes containing sodium carbonate debris are anticipated. There is no evidence that ion exchange processing of the carboxylic acid containing liquors derived from coal oxidation will not irreversibly foul ion exchange resins due to their non-water soluble components (e.g. tars and pitches). See Oshika et al reference below. The economically viable production of aromatic coal containing carboxylic acid liquors for purposes of SOx and NOx control via conversion to their calcium carboxylates has not been reduced to practice. Due to the high potential commercial value of such compounds, it is obvious that techniques for their production in the prior art have not been commercially viable.

5. The prior art has only demonstrated the use of powdered calcium organic salts or hydrophilic solutions of calcium organic salts (aqueous solutions) for sulphur dioxide and NOx control. This has apparently been done to maximize the dissolved calcium content of the aqueous organic calcium salt solutions. Hydrophilic solutions have a poor ability to wet or mix with hydrophobic sulphur containing fossil fuels such as coal or fuel oil. They are therefore not expected to significantly accelerate coal combustion and reduce NOx emissions due to accelerated coal combustion since they have a poor ability to wet or coat the coal prior to or during combustion. The ability of adsorbed calcium organic species to accelerate coal combustion is attributed to the fact that calcium oxide which is generated during thermal decomposition of a hydrophobic or hydrophobic/hydrophilic organic calcium salt mixture which can easily wet or mix with the sulphur containing fossil fuel, is in direct physical contact with the fuel and can transfer oxygen to the fuel through the solid phase in addition to the gas phase. That is to say that calcium oxide which is in physical contact with the sulphur containing fossil fuel at high temperature has the ability to accelerate fossil fuel combustion and thereby indirectly reduce NOx emissions above levels available with hydrophilic sources of organic calcium salts (e.g. calcium acetate, calcium propionate, calcium formate, calcium benzoate, calcium isophthalate) described in the prior art.

6. The $NO_x$ reduction capability of hydrophilic calcium compounds is poor. Reported tests (Simons et al., 1992; Steciak et al., 1994) using solutions of calcium acetate, calcium magnesium acetate and calcium propionate suggest that the salt is approximately 10% effective (one mole NO per ten moles Ca or Mg) in reducing NO. To quantify this result, consider combustion systems emitting 3000 ppm $SO_2$ and between 300 and 1000 ppm NO. Injecting 3000 ppm Ca to remove the $SO_2$ at Ca/S=1 will also remove 300 ppm NO. That is marginally enough to control emissions from a low $NO_x$ furnace and completely inadequate for the higher $NO_x$ emission levels. Even at a 2:1 calcium to sulfur mole ration, NO emission control would still be unsatisfactory using calcium acetate and calcium propionate. Further tests (Steciak et al., 1994b) demonstrate an 18% effectiveness for calcium benzoate which will control $NO_x$ emissions at a 2:1 calcium to sulfur mole rate. The prior art is thus capable of controlling $NO_x$ emissions by operating at twice the required calcium. Hydrophobic/hydrophilic mixtures will be shown to be more effective in reducing NO (40% to 65% effective per calcium) and more water soluble. Hence, hydrophobic/hydrophilic mixtures will control up to 2000 ppm NO at a 1:1 calcium to sulfur mole ration and do so with less water and organic mass injection.

7. In cases where the prior art describes the use of powdered dry salts of organic calcium carboxylates there is no opportunity for the salt to coat or mix with the sulphur containing fossil fuel in a manner which would allow calcium oxide formed by thermal decomposition of the organic calcium salt to physically or chemically bond to the fossil fuel so as to accelerate fossil fuel combustion and thereby reduce NOx emissions.

The prior art has not recognized the need for hydrophobic/hydrophilic organic calcium salt mixtures which have the ability to coat sulphur containing fossil fuels such as coal or fuel oil, before or during combustion, so as to enhance the ability of the organic calcium salts to simultaneously reduce $SO_x$ and NOx emissions or accelerate fossil fuel combustion. The prior art has also not recognized the need for an inexpensive source of organic calcium salts which have hydrophobic as well as hydrophilic properties. The prior art has not demonstrated an economical method for the production of hydrophobic/hydrophilic organic calcium salt containing mixtures.

RELEVANT LITERATURE

Shanpei Ye, and Zhenzong Fu, "Desulfurization Test of Sorbent E1 in a Bench-Scale Fluidized-Bed Coal Combustor", Coal Combustion Science and Technology of Industrial and Utility Applications, Hemisphere Publishing Corporation, New York, pages 565–572 teach particle abrasion in fluidized beds of fossil fuels.

Levendis, 1989, "Catalysis of the Combustion of Synthetic Char Particles by Various Forms of Calcium Additives", Journal of Energy and Fuel discusses the use of aqueous alkali metal acetates as combustion accelerators.

Elliot et al., 1990–1991, "Energy and Fuels", Volume 5, pages 399 to 410; Beckman, D., and Graham, R., "Economic Assessment of a Wood Fast Pyrolysis Plant", AITBC Conference, Interlaken, Switzerland 1992; Piskorz J., et al., "Liquid Products from the Fast Pyrolysis of Wood and Cellulose", Research in Thermal Biomass Conversion, Elsevier Science Publishers, New York, 1988, pages 557 to 571, all relate to the rapid pyrolysis of biomass to produce fuels.

Oshika, T. et al., 1994, "Formation of Aromatic Carboxylic Acids from Coal-Tar Pitch by Two-Step Oxygen in Water and in Alkaline Solution", Fuel, Volume 73, Number 1, pages 77 to 81.

Simons, G. A., et al., 1992, "Combined NOx/SOx Control Using a Single Liquid Injection System", Physical Sciences Inc., TR-1169.

Steciak, J. et al., 1994, "Reduction of Combustion-Generated $S_2$-NOx by fine mists of CMA", Nineteenth International Technical Conference on Coal Utilization & Fuel Systems, Clearwater Beach, Fla., April 1994.

Steciak, J.; Zhu, W.; Levendis, Y. A.; and Wise, D. L. (1994b), "The Effectiveness of Calcium (Magnesium) Acetate and Calcium Benzoate as $NO_x$ Reduction Agents in Coal Combustion", Combust. Sci. and Tech., 102, 193–211.

SUMMARY OF THE INVENTION

The present invention seeks to use hydrophobic/hydrophilic organic alkaline earth metal salt mixtures, for example those containing calcium, to reduce acid emissions. The invention does not exclude aliphatic carboxylic acids, calcium salts of alcohols (calcium alkoxides including calcium phenoxides), non-hydrophilic calcium salts such as calcium phenoxides and non-alkalititratable organics in the calcium salt mixture such as ketones, carbohydrates and low molecular weight alcohols.

Accordingly the present invention is a method of reducing acid emission and ozone depletion precursors such as sulphur dioxides and nitrogen oxides from a flue gas produced by the combustion of sulphur or nitrogen containing fuel or acid emissions and ozone depletion precursors from chemical plants, the method comprising introducing into a flue containing the flue gas, an additive derived from the chemical reaction of pyrolysis liquor with an alkaline earth metal compound in the presence of an oxidant to produce a hydrophobic/hydrophilic mixture containing a plurality of thermolabile alkaline earth metal compounds able to decompose at flue gas temperature to produce an alkaline compound able to react with sulphur dioxide and oxides of nitrogen.

Preferably the above mentioned additive is incorporated into the fuel but the additive containing the thermolabile compound may be injected into either the combustion zone or the flue.

The fuel may be, for example, coal, petroleum tar pitch, fuel oil, pyrolysis liquor, natural gases, garbage or biomass.

In a preferred embodiment the pyrolysis liquor is derived from a feed stock containing cellulose, lignin or starch. The pyrolysis liquor is usually acidic or phenolic and is at least partially neutralized by a basic alkaline earth metal compound. The acidic components of the pyrolysis liquor, typically carboxylic acids, and the basic alkaline earth metal compound, react to produce the thermolabile compounds.

The basic compound may be an alkaline earth metal oxide, hydroxide or carbonate. Calcium oxide is preferred for its cheapness, availability and speed of reaction with the pyrolysis liquor.

The oxidant may be oxygen, for example contained in air. Oxidation can oxidize carbonyl species contained in the pyrolysis liquor, for example an aldehyde, to a carboxylic acid, able to react with the alkaline earth metal compound.

The invention also provides a method of producing a hydrophobic/hydrophilic liquor containing at least one thermolabile compound, able to wet a solid sulphur or nitrogen containing fuel such as coal followed by dehydration of the resulting mixture to produce a fuel suitable for combustion such that the thermolabile portion of the dehydrated liquor can decompose at combustion or flue gas temperature to produce compounds able to react with sulphur dioxide or oxides of nitrogen, the method comprising at least partially neutralizing an acidic pyrolysis liquor with a basic alkaline earth compound.

In the invention the simple alkaline earth metal compounds that are added to pyrolysis liquor react with various carboxylic acids present in the liquor to produce, for example, carboxylates, phenoxides, saccharides and the like. All these alkaline earth metal organic compounds undergo thermal decomposition to yield carbonates, bicarbonates, hydroxides and oxides on heating over a wide range of temperatures after the treated pyrolysis liquor has been mixed with a sulphur or nitrogen containing fuel.

Thermal decomposition of the organic salts, for example calcium salts, produces higher surface area calcium oxide than has been achieved from non-organic metallic salts, such as calcium carbonate. It is believed that this is due to the abrasive and turbulent action of gases such as carbon dioxide and water generated during the thermal decomposition. The effect is particularly useful for rupturing sulphite and sulphate films fouling the oxide adsorbents, such as calcium oxide, used in sulphur dioxide removal during fossil fuel combustion. Furthermore the moles of gas evolved per mole of alkali earth metal oxide, hydroxide or carbonate during thermal decomposition of the alkaline earth metal salts derived from biomass pyrolysis liquors, is much higher than the amount of gas produced from conventional sources. The following equations illustrate this fact:

Calcium carbonate. Only 1 mole of gas evolved per mole of calcium oxide generated $$CaCO_3 \rightarrow CaO + CO_2$$

Calcium glycolate 5 Moles of gas evolved per mole of metal oxide generated $$Ca(HO-CH2-COO)_2 + \tfrac{1}{2}O_2 \rightarrow CaO + 2CO_2 + 3H_2O$$

In the absence of oxygen (e.g. gasification), calcium oxide or other species can still be generated with the evolution of gas by reactions such as the following:

Calcium acetate
$$Ca(CH_3COO)_2 \longrightarrow CaO + CH_3-CO-CH_3 + CO_2 \text{ (acetone)}$$

Sulphur and nitrogen containing fuels which are hydrophobic in nature have a greater ability to absorb alkaline earth metal salts from pyrolysis liquors, which have a hydrophobic as well as a hydrophilic component, unlike conventional aqueous solutions of alkaline earth carboxylate salts, such as calcium acetate and calcium formate, which only have a hydrophilic component. The significance of this is that hydrophobic fuel sources are more intimately contacted with hydrophobic sources of organic calcium compounds than hydrophilic sources of organic calcium compounds alone thereby resulting in more effective chemical reactions between NOx, SOx and the thermolabile calcium compounds. Absorption of hydrophobic plus hydrophilic alkaline earth metal salts such as those derived form calcium will increase the speed of coal combustion thereby reducing nitrogen oxide emissions. The wetting of hydrophobic fuels either before or during combustion by hydrophobic or hydrophobic/hydrophilic mixtures of organic calcium compounds will improve NOx reduction capability over the prior art.

The combination of alkaline earth metal salts with biomass pyrolysis liquor represents a relatively inexpensive source of hydrophobic/hydrophilic alkaline earth containing additive for reducing sulphur dioxide and nitrogen oxides during sulphur or nitrogen containing fuel combustion.

The following examples describe the invention:

EXAMPLE 1

Preparation of Alkaline Earth Salt Liquors

An alkaline earth salt liquor (e.g. calcium oxide in water) is mixed with an acidic biomass pyrolysis liquor to produce a hydrophobic/hydrophilic solution, or solutions (e.g. organic hydrophobic solution plus aqueous hydrophilic solution) or suspension of alkaline earth salts (e.g. calcium propionate, calcium glycolate, calcium formate, calcium acetate, calcium lactate, calcium phenoxides, calcium saccharides, etc.).

EXAMPLE 2

Preparation of Alkaline Earth Salt Liquors

Pyrolysis liquor is aerated in the presence of alkaline earth metal compounds such as carbonates, hydroxides, or oxides to oxidize or disproportionate some or all of the carbonyl species contained in the pyrolysis liquors, such as aldehydes, to carboxylic acid species which can form salts such as those described in Example 1. Examples of these oxidation and disproportionation products include the following:

Formaldehyde→formic acid

Hydroxyacetaldehyde→glycolic acid

Methyl glyoxal→pyruvic acid

Aromatic aldehydes→phenols or aromatic carboxylic acids

EXAMPLE 3

Preparation of Alkaline Earth Salt Liquors in the Presence of Fossil Fuels

Biomass pyrolysis liquor is mixed with alkaline earth metal compound(s) in the presence of sulphur or nitrogen containing fossil fuel such as powdered coal, with or without aeration, prior to combustion or gasification. The purpose of this approach is to increase alkaline earth compound adsorption or decomposition of acidic surface coal species or those contained in the pyrolysis liquor.

EXAMPLE 4

The biomass pyrolysis liquor mixed with alkaline earth metal compounds, as described in Examples 2 and 3, may be injected directly into the flue, subsequent to the combustion, to achieve the desired neutralization. The flue gas must be hot enough to cause the breakdown of the organic compounds able to neutralize the sulphur and nitrogen compounds.

EXAMPLE 5

The biomass pyrolysis liquor mixed with alkaline earth metal compounds with or without aeration, as described in Example 3, may be injected directly into the combustion zone, to achieve the desired neutralization. The combustion zone must be hot enough to cause the breakdown of the organic compounds able to neutralize the sulphur compounds and nitrogen.

EXAMPLE 6

The biomass pyrolysis liquor mixed with alkaline earth metal compounds, as described in Examples 1 or 2, may be injected directly into the combustion zone, to achieve the desired neutralization of sulphur and nitrogen compounds. Again the combustion zone must be hot enough to cause the breakdown of the organic compounds able to neutralize the sulphur compounds and nitrogen.

EXAMPLE 7

The biomass pyrolysis liquor mixed with alkaline earth metal compounds, as described in Examples 1 or 2, may be dehydrated with or without pulverization and the resulting particulate injected directly into the flue, subsequent to the combustion zone, to achieve the desired neutralization of sulphur and nitrogen compounds. The flue gas must be hot to cause the breakdown of the organic compounds able to neutralize the sulphur compounds and nitrogen.

EXAMPLE 8

This example demonstrates the effectiveness of hydrophobic components in organic calcium salt mixtures with respect to NO emission control. A distillate derived from pyrolysis liquor described in U.S. Pat. No. 5,264,623 containing formic acid, acetic acid and propionic acid plus organic impurities was reacted with lime to produce anhydrous calcium sales according to that invention. This patent describes the production of salts with or without solvent washing of the salts (e.g. with methanol). We have discovered that the use of an aqueous solution of calcium acetate/formate/propionate mixture which was washed with methanol to remove hydrophobic organic impurities achieved 40% effectiveness in removing NO from a flue gas (i.e. 4 moles of NO removal required 10 moles of calcium input). However, the use of a hydrophobic/hydrophilic mixture of the same salts without removal of the hydrophobic organic impurities by methanol designated as "other" components on page 5 and page 7 of U.S. Pat. No. 5,264,623 achieved 65% effectiveness in removing NO from a flue gas (i.e. 6.5 moles of NO removal required 10 moles of calcium input). This Example clearly demonstrates the effectiveness of hydrophobic components in an organic calcium salt mixture for purposes of NOx control. It also demonstrates the effectiveness of mixed organic calcium salts vs. individual organic calcium salt compounds for purposes of NOx control. Unfortunately the use of pyrolysis liquor distillates derived by vacuum distillation of pyrolysis liquor is uneconomical for purposes of organic calcium salt preparation for NOx control compared with organic calcium salt preparation as described by the current invention for the following reasons:

non-volatile distillation residues with the potential ability to form thermolabile organic calcium compounds or enhance the hydrophobic properties of organic calcium compounds are wasted due to their tendency to polymerize as water is removed from the pyrolysis liquor by distillation.

the capital cost of vacuum distillation systems is high much material containing aldehydes which could be converted to organic calcium salts via oxidation the aldehydes is wasted either in the distillates or the distillation residues.

EXAMPLE 9

The biomass pyrolysis liquor mixed with alkaline earth metal compounds, as described in Examples 1, 2 or 3, may be dehydrated with or without pulverization and the resulting particulate injected directly into the combustion zone, to achieve the desired neutralization. The combustion zone must be hot enough to cause the breakdown of the organic compounds able to neutralize the sulphur and the nitrogen compounds.

EXAMPLE 10

Large quantities of hydrogen sulphide are produced as a byproduct in the purification of natural gas, petroleum and coal-coking operations. To recover sulphur, the concentrated hydrogen sulphide gas stream is fired in a combustion chamber and burned in such a manner that part of the hydrogen sulphide is converted to sulphur dioxide. The products of combustion are cooled and then passed through a catalyst packed converter, in which the hydrogen sulphide and sulphide dioxide react to form sulphur and water. The tail gas from the stack containing the hydrogen sulphide, which was not converted to sulphur, is typically burned to convert it to sulphur dioxide and released to the atmosphere. The biomass pyrolysis liquor mixed with alkaline earth metal compounds, as described in Examples 1 or 2 above either used as is or dehydrated, can be combusted together with the hydrogen sulphide/sulphur dioxide containing burner or tail gas described above to reduce hydrogen sulphide/SOx emissions.

EXAMPLE 11

The biomass pyrolysis liquor mixed with alkaline earth metal compounds and fossil fuels with or without aeration as described in Example 3 may be dehydrated to form a particulate mixture with or without pulverization and then injected directly into the combustion zone to achieve the desired neutralization. The combustion zone must be hot enough to cause the breakdown of the organic compounds able to neutralize the sulphur and the nitrogen compounds.

EXAMPLE 12

Large quantities of hydrogen sulphide, methyl mercaptan, dimethyl sulphide, dimethyl disulphide (referred to collectively as TRS or "total reduced sulphur compounds") and sulphur dioxide are produced as gaseous discharges from a variety of wood pulping operations (e.g. Kraft or Sulphite process). The biomass pyrolysis liquor mixed with alkaline earth metal compounds, as described in Examples 1 or 2 above either used as is or dehydrated, can be combusted together with these pulp mill emissions to reduce TRS/SOx emissions.

Although the forgoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

We claim:

1. A method of reducing acid emissions and ozone deletion precursors from a flue gas produced by the combustion of sulphur- or nitrogen-containing fuel or acid emissions and ozone depletion precursors from chemical plants, the method comprising the step of introducing into a flue containing the flue gas a liquor additive comprising a pyrolysis liquor, which is initially acidic due to the presence of one or more acidic components and is at least partially neutralized by a basic alkaline earth metal, whereby the liquor contains at least one thermolabile alkaline earth metal compound which is formed by the reaction of said one or more acidic components with said basic alkaline earth metal compound and is able to decompose at flue gas temperature to produce an alkaline compound able to react with sulphur dioxide and oxides of nitrogen.

2. A method as claimed in claim 1 in which the thermolabile additive is incorporated into the fuel.

3. A method as claimed in claim 1 in which the thermolabile additive is injected into the flue.

4. A method as claimed in claim 1 in which the thermolabile additive is injected into the fuel combustion zone.

5. A method as claimed in claim 1 in which the acid emission and ozone depletion precursors are the oxides of sulfur and nitrogen.

6. A method as claimed in claim 1 wherein oxygen is present as an oxidant in said chemical reaction.

7. A method as claimed in claim 1 in which water is also introduced during the chemical reaction of pyrolysis liquor with an alkaline earth metal compound.

8. A method as claimed in claim 1 in which the fuel is coal, petroleum tar or pitch.

9. A method as claimed in claim 1 in which the pyrolysis liquor is derived from a feed stock containing cellulose, lignin or starch.

10. A method as claimed in claim 1 in which the alkaline earth metal compound is an oxide, hydroxide or carbonate.

11. A method as claimed in claim 10 in which the compound is calcium hydroxide or calcium oxide.

* * * * *

REEXAMINATION CERTIFICATE (3974th)

United States Patent
[19]

Oehr et al.

[11] B1 5,645,805

[45] Certificate Issued: Jan. 11, 2000

[54] REDUCTION OF ACID RAIN AND OZONE DEPLETION PRECURSORS

[75] Inventors: Klaus Heinrich Oehr, Surrey, Canada; Girard A. Simons, Lynnfield, Mass.; Jiahua Zhou, Vancouver, Canada

[73] Assignee: Dynamotive Corporation, Vancouver, Canada

Reexamination Request:
No. 90/004,879, Dec. 23, 1997

Reexamination Certificate for:
Patent No.: 5,645,805
Issued: Jul. 8, 1997
Appl. No.: 08/491,751
Filed: Jun. 19, 1995

Related U.S. Application Data

[63] Continuation-in-part of application No. 08/130,123, Sep. 30, 1993, Pat. No. 5,458,083.

[51] Int. Cl.[7] ............................ B01D 53/60; C01B 21/00; C10L 10/00
[52] U.S. Cl. ....................... 423/239.1; 44/604; 252/192; 423/235; 423/243.08; 423/244.07; 431/3
[58] Field of Search .................... 252/192; 44/604; 423/239.1, 235, 243.08, 244.07; 431/3

[56] References Cited

U.S. PATENT DOCUMENTS

| | | | |
|---|---|---|---|
| 3,970,434 | 7/1976 | Gasior et al. | 44/604 |
| 4,615,871 | 10/1986 | Yoon | 423/243 |
| 5,264,623 | 11/1993 | Oehr et al. | 562/515 |

OTHER PUBLICATIONS

Girard A. Simons, "White Paper for Combined $NO_x/SO_x$ Control in Coal Fired Utilities Using Biomass Waste Feedstock," May 1992.

K.H. Oehr and G. Barrass, "Biomass Derived Alkaline Carboxylate Road Deicers," The Chameleon Press Limited, London, U.K., May 1992.

P.K. Sharma, "Calcium Impregnation of Coals as a Means for Sulphur Emissions Control in Combustion," Calcium Magnesium Acetate, An Emerging Bulk Chemical for Environmental Applications pp. 273–284, Elsevier, New York, 1991.

*Primary Examiner*—Richard D. Lovering

[57] ABSTRACT

A method of reducing acid emissions and ozone deletion precursors from a flue gas produced by the combustion of sulphur-or nitrogen-containing fuel or acid emissions and ozone deletion precursors from chemical plants. The method comprises introducing into a flue containing the gas, an additive derived from the chemical reaction of pyrolysis liquor with an alkaline earth metal compound in the presence of an oxidant. This reaction produces a hydrophobic/hydrophilic mixture containing a plurality of thermolabile alkaline earth metal compounds. These compounds are able to decompose at flue gas temperature to produce an alkaline compound able to react with sulphur dioxide and oxides of nitrogen to eliminate them from the gas.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 5 is cancelled.

Claims 1, 2, 6 and 11 are determined to be patentable as amended.

Claims 3, 4 and 7–10, dependent on an amended claim, are determined to be patentable.

New claims 12 and 13 are added and determined to be patentable.

1. A method of reducing acid emissions and ozone depletion precursors from a flue gas produced by the combustion of sulphur- or nitrogen-containing fuel or acid emissions and ozone depletion precursors from chemical plants, the method comprising the step of introducing into a flue containing the flue gas a liquor additive comprising a *hydrophilic phase and a hydrophobic phase of a biomass* pyrolysis liquor, which is initially acidic due to the presence of one or more acidic components and is at least partially neutralized by a basic alkaline earth metal, [whereby] *wherein each of the hydrophilic and hydrophobic phases of* the liquor contain[s] at least one thermolabile alkaline earth metal compound which is formed by [the] *a* reaction of said one or more acidic components with said basic alkaline earth metal compound and is able to decompose at flue gas temperature to produce an alkaline compound able to [react with] *simultaneously reduce* sulphur dioxide and oxides of nitrogen.

2. A method as claimed in claim 1 in which the thermolabile additive is incorporated into the fuel *by coating, wetting or absorption.*

6. A method as claimed in claim 1 wherein oxygen is present as an oxidant in said [chemical] reaction *of said one or more acidic components with the basic alkaline earth metal compound.*

11. A method as claimed in claim 10 in which the *alkaline earth metal* compound is calcium hydroxide or calcium oxide.

12. *A method of reducing acid emissions and ozone depletion precursors from a flue gas produced by the combustion of sulphur-or nitrogen-containing fuel or acid emissions and ozone depletion precursors from chemical plants, the method comprising introducing into a flue containing the flue gas at a flue gas temperature a liquor additive comprising a hydrophilic phase and a hydrophobic phase of a biomass pyrolysis liquor, the pyrolysis liquor being initially acidic due to the presence of one or more acidic components and being at least partially neutralized by a basic alkaline earth metal compound, the liquor additive containing at least one thermolabile alkaline earth metal compound in each of the hydrophilic phase and the hydrophobic phase of the pyrolysis liquor the thermolabile alkaline earth metal compounds being formed by the reaction of said one or more acidic components with said basic alkaline earth metal compound, the thermolabile alkaline earth metal compound being able to decompose at the flue gas temperature to produce an alkaline compound able to simultaneously reduce sulphur dioxide and oxides of nitrogen in the flue gas.*

13. *A method of reducing levels of sulphur dioxide and oxides of nitrogen in a flue gas produced by the combustion of sulphur-or nitrogen-containing fuel, the method comprising introducing into a flue containing the flue gas at a flue gas temperature a hydrophilic phase and a hydrophobic phase of a biomass pyrolysis liquor, the pyrolysis liquor comprising at least one thermolabile alkaline earth metal compound in each of the hydrophilic phase and the hydrophobic phase of the pyrolysis liquor, the thermolabile alkaline earth metal compounds being formed by the reaction of said one or more acidic components in the pyrolysis liquor with a basic alkaline earth metal compound, the thermolabile alkaline earth metal compounds being able to decompose at the flue gas temperature to produce an alkaline compound able to simultaneously reduce sulphur dioxide and oxides of nitrogen in the flue gas.*

* * * * *